United States Patent
Israni

(10) Patent No.: US 9,603,370 B2
(45) Date of Patent: Mar. 28, 2017

(54) METHOD OF MAKING FLAT EDIBLE USING A COMPACT APPARATUS

(71) Applicant: Pranoti Nagarkar Israni, Singapore (SG)

(72) Inventor: Pranoti Nagarkar Israni, Singapore (SG)

(73) Assignee: ZIMPLISTIC PTE. LTD., Singapore (SG)

( * ) Notice: Subject to any disclaimer, the term of this patent is extended or adjusted under 35 U.S.C. 154(b) by 318 days.

(21) Appl. No.: 14/445,122

(22) Filed: Jul. 29, 2014

(65) Prior Publication Data

US 2014/0335243 A1 Nov. 13, 2014

Related U.S. Application Data

(62) Division of application No. 13/264,622, filed on Oct. 14, 2011, now Pat. No. 8,820,221.

(51) Int. Cl.
*A21C 11/00* (2006.01)
*A21C 1/00* (2006.01)
*A21C 1/14* (2006.01)

(52) U.S. Cl.
CPC .......... *A21C 11/006* (2013.01); *A21C 1/003* (2013.01); *A21C 1/1425* (2013.01); *A21C 1/1455* (2013.01)

(58) Field of Classification Search
CPC combination set(s) only.
See application file for complete search history.

(56) References Cited

U.S. PATENT DOCUMENTS

| 4,664,025 A | * | 5/1987 | Martinez | A47J 37/0611 100/292 |
| 4,747,690 A | * | 5/1988 | Hayashi | A21C 1/146 366/141 |
| 4,838,153 A | * | 6/1989 | Escamilla | A21B 5/03 99/349 |
| 5,993,187 A | * | 11/1999 | Manser | A21C 1/003 425/202 |
| 6,089,144 A | * | 7/2000 | Garber | A21B 5/023 219/521 |
| 6,205,914 B1 | * | 3/2001 | McCarney | A21C 11/006 425/385 |
| 6,672,203 B1 | * | 1/2004 | Tomatis | A21C 9/08 99/349 |

(Continued)

*Primary Examiner* — Quang D Thanh
*Assistant Examiner* — Renee Larose
(74) *Attorney, Agent, or Firm* — Geeta Kadambi; Riddhi IP LLC

(57) ABSTRACT

A method of using compact apparatus for automatically making a plurality of flat edibles includes a storage and dispensing limit that makes it unnecessary for a user to pre-measure ingredients. The apparatus also includes a mixing and kneading unit for making dough of optimal consistency. The dough prepared may be transferred onto a lower platen from a transfer base by a transfer sweeper. The dough may be flattened in a platen unit. An upper platen and the lower platen of the platen unit may be heated to a pre-programmed temperature for cooking the flat edible. The temperature may also be manually set by the user based on user's preference. The flat may be cooked by the platen unit. This method has very little human intervention. One has to load the flour and water in their respective containers and every other step is automated.

15 Claims, 12 Drawing Sheets

(56) References Cited

U.S. PATENT DOCUMENTS

| | | | | |
|---|---|---|---|---|
| 6,827,476 B2* | 12/2004 | Lowry | ............... | A21C 1/1455 |
| | | | | 366/100 |
| 7,077,558 B2* | 7/2006 | Bodenstorfer | ......... | A21C 7/005 |
| | | | | 366/76.7 |
| 7,140,864 B1* | 11/2006 | McCarney | ........... | A21C 11/006 |
| | | | | 425/318 |
| 2006/0236872 A1* | 10/2006 | Nordberg | ............... | A21B 7/005 |
| | | | | 99/349 |

\* cited by examiner

METHOD OF MAKING FLAT EDIBLE USING A COMPACT APPARATUS

CROSS RELATED APPLICATION

This application claims priority to PCT application PCT/SG2010/000150, filed on Apr. 14, 2010 and U.S. application Ser. No. 13/264,622 filed on Oct. 14, 2011, now allowed. The PCT application PCT/SG2010/000150 and U.S. application Ser. No. 13/264,622 are hereby incorporated by reference in its entireties for all of its teachings.

FIELD OF INVENTION

This disclosure relates generally to a method of making flat edibles like tortilla, crepes, chapatis, rotis, pita breads etc., using a compact apparatus.

BACKGROUND OF INVENTION

Invention and use of devices to aid in food production is known to public. Currently available is a whole array of automated mixing, flattening, and cooking devices designed to simplify a production process of flat dough products such as Tortillas, Puri, Papadam and Chapati. An attempt to make a single semi-automatic device suitable for industrial use by Chandulal Patel in U.S. Pat. No. 5,630,358. However, as per Chandulal Patel disclosure users needed to add measured quantities of ingredients to the device. The device then mixes the dough, flattens it, and puts it on a conveyor belt for cooking. Adding right quantities of ingredients of right measure to the device may not have been possible by an unskilled user or a user who had little knowledge of making edibles. In addition, the device as described in Chandulal Patel did not have capacity for storing excess ingredients. Furthermore, the device did not have a corrective mechanism if the user adds ingredients in incorrect proportion. Furthermore, the device as described in Chandulal Patel was bulky with a conveyer and a carousel that was at least twice the size of the edibles being made. Furthermore, the device used pneumatics for pressurizing rendering the device expensive and bulky for home use.

SUMMARY OF INVENTION

This disclosure describes about a method and a series of steps that is fully automated using a compact and portable apparatus. The method described herein may be used to produce flatbreads, tortillas, rotis, parathas, crepes, chapatis, and numerous other dough based food products. The method with a series of steps is used for dispensing ingredients, mix the ingredients, kneading the mixture, flattening the kneaded mixture, shaping the flattened kneaded mixture and cooking the mixture into a food product based on input obtained from internal monitoring sensors and/or inputs given by the user. The apparatus may be capable of producing either a single product at a time or simultaneously processing one product while other is being cooked. The apparatus may not require continuous monitoring by the user as the apparatus is configured to generate alert for the user if intervention is required. The apparatus may include storage and dispensing unit, a mixing and kneading unit, a vertical transfer unit, a horizontal transfer unit, a pressing and heating unit, and a control unit. The control unit may include a processor which can be preprogrammed or controlled based on user input. The user may provide input through a control panel to generate an edible of desired size, thickness, at a specific cooking temperature, in a specified time, and a number of edibles to be produced. Based on the user input, the control unit configures the storage and dispensing unit to dispense appropriate quantities of ingredients for generating a first edible. A mixing and kneading unit of the apparatus may be configured to mix the ingredients and to knead the mixed ingredients into dough.

A shape of the blade of the mixing and kneading unit as described in the disclosure ensures a good consistency for the dough, and prevents sticking. A vertical transfer unit of the apparatus may be then configured to transfer the dough to a platen unit of the apparatus. The ring shaped feature (optional) in a vertical transfer unit of the apparatus may remove any dough sticking to the sides of the mixing and kneading unit. Alternatively, a hot water may be used for cleaning the mixing and kneading unit. A horizontal transfer unit of the apparatus may be configured to move the dough to a platen unit for flattening and cooking.

The platen unit may be configured to flatten and cook the dough. The platen unit may include an upper platen and a lower platen configured to move relative to each other. These platens may be pre-heated to an appropriate temperature or at temperatures input by the user. The upper platen may be moved towards the lower platen to flatten the dough into a flat edible with thickness as input by user, using a spacer or as preprogrammed. The upper platen may be moved away from the lower platen and is held at an appropriate distance that is programmed into the apparatus. The upper platen may be held at an appropriate distance for a particular period to bake/cook the product. After the edible is sufficiently cooked, the horizontal transfer unit may be configured to push the edible out of the platen unit into a receptacle (tray) designed thereof.

A method, system and an apparatus of a compact appliance for making flat edibles is disclosed. In one aspect, an apparatus includes a first dispenser comprising a liquid material, and a second dispenser comprising a grounded edible material. The method also includes a consistency module to obtain dough of optimal consistency through at least one of an automatic adjustment and manual adjustment of an admixture of the liquid material and the grounded edible material surrounding a blade of the apparatus based on an electrical property associated with a rotation of the blade.

In another aspect, a method includes making a flat edible material. The method also includes mixing a grounded edible material and a liquid material to make dough. In addition, the method includes optimizing an input of the grounded edible material and the liquid material to obtain an optimal consistency of the dough based on a change in current read as a resistance caused by mixing the grounded edible material and liquid material while forming the dough. The method also includes flattening the dough to make the flat edible with a pressure mechanism between an upper platen and a lower platen and cooking the flattened dough.

In yet another aspect, an apparatus includes a modular unit to make a flat edible. The apparatus includes a first dispenser, a second dispenser, a mixing and kneading bowl, a pressure unit, a horizontal transfer unit, an upper platen, a lower platen, and a processor.

The apparatus described herein is a single machine that can store, dispense, mix, knead, flatten and cook a flat food product, thereby eliminating the need for several pieces of equipment or for any user intervention for making flat edibles. In addition, the apparatus described herein may minimize user intervention by having a self-clean mode that invokes a cleaning operation in the apparatus to perform cleaning operation after producing a batch of edibles. Furthermore, the apparatus described herein may be designed as a compact, portable, and counter-top appliance for making flat edibles. Furthermore, the apparatus eliminates a need of user to pre-measure quantities of ingredients to be added into the apparatus for the process of making the said flat edibles. A storage and dispensing unit of the apparatus may be designed to store a large or small quantity of ingredients as desired by the user. In addition, the apparatus may be programmed to dispense programmed quantities of ingredients required for making the food product. Also, the apparatus described herein may be designed to allow storage of raw materials needed for producing flat edibles, so that the apparatus may be used as a stand-alone unit.

The apparatus described herein may be designed to process ingredients and produce cooked edible simultaneously through mixing and kneading in a mixing and kneading unit to produce a dough while, cooking a flattened dough in a pressing and heating unit. The apparatus described herein may be designed to enable the user to control a quantity of edible production, quality, cooking temperature, cooking time, consistency, thickness, size and such other parameters of the product (e.g., edible) through the control panel for providing suitable values to the apparatus. In addition, the apparatus described herein enables the user to change the values as desired through the control panel provided in the apparatus.

Other features and advantages will be apparent from the detailed description, taken in conjunction with the accompanying drawings, which illustrate, by way of example, the principles of the current apparatus.

BRIEF DESCRIPTION OF FIGURES

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

A method, system and an apparatus of a compact appliance for making flat edibles are disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
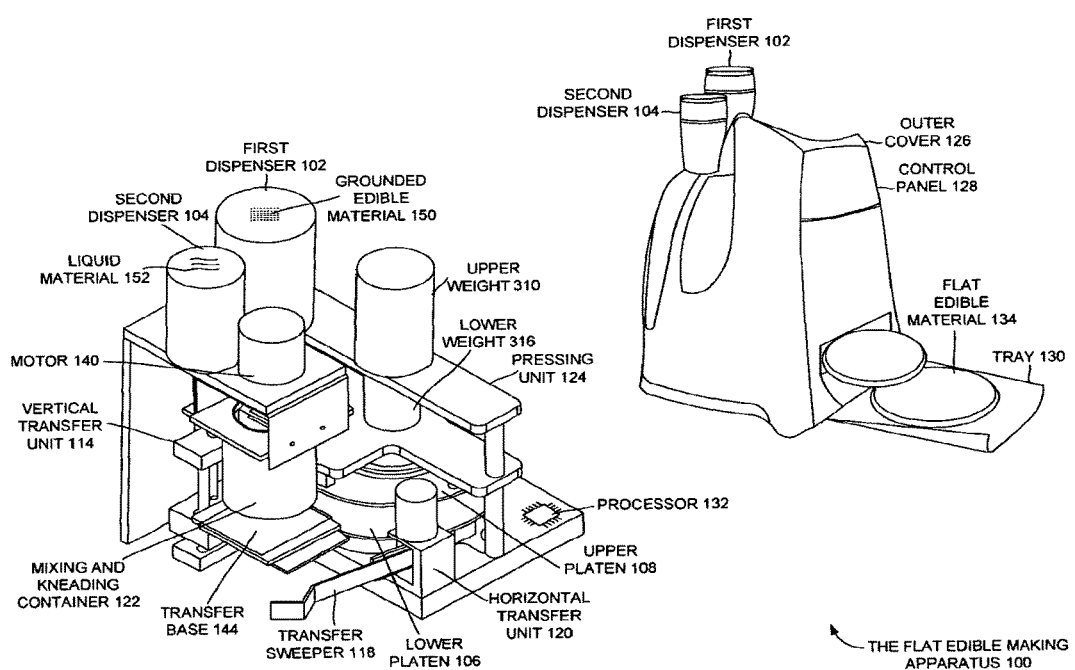
FIG. 1 is a perspective view illustrating a flat edible making apparatus, according to one or more embodiments.

FIG. 1 is a perspective view illustrating a flat edible making apparatus 100, according to one or more embodiments. In particular, FIG. 1 illustrates a view of the apparatus 100 with an outer cover 126 and a view of the apparatus 100 without an outer cover. In one or more embodiments, the apparatus 100 described herein is used for generating flat edibles. In one or more embodiments, the apparatus 100 may include a first dispenser 102 and a second dispenser 104 for intake of a grounded edible material 150 and a liquid material 152 respectively. In one or more embodiments, the first dispenser 102 and the second dispenser 104 may also be used as storage for storing the ingredients. In one or more embodiments, the dispensers 102 and 104 may be refilled accordingly as per requirements. In one or more embodiments, each dispenser may be coupled with an actuator (e.g., motors, pumps, solenoid) to control a flow of ingredients.

In one or more embodiments, more such dispensers may be added to the apparatus 100 through modification in design. In one or more embodiments, the dispensers may be detachable for cleaning.

In one or more embodiments, a processing section of the apparatus 100 includes a vertical transfer unit 114, a transfer sweeper 118, a horizontal transfer unit 120, a mixing and kneading container 122, a pressing unit 124, a transfer base 144, and a platen unit 106 and 108. In one or more embodiments, an output section of the apparatus 100 may include a tray 130. In one or more embodiments, the apparatus 100 may be controlled using a control panel 128 provided thereof. In one or more embodiments, instructions obtained through the user interface of the control panel 128 may be processed by a processor 132 of the apparatus 100 to render the apparatus 100 to generate a flat edible material 134.

In one or more embodiments, the platen unit may include a lower platen 106 and an upper platen 108. The platen unit may be used for generating a flat edible material of desired thickness from dough. The thickness information of the flat edible 134 may be input by a user through the user interface of the control panel 128.

Furthermore, the platen unit may also be used for cooking the flat edible material. The upper weight 310 and the lower weight 316 may be a part of the platen unit. The platen unit may include the pressing unit 124 for flattening a dough. The platen unit may be further explained in FIG. 3.

In one or more embodiments, the vertical transfer unit 114 may be used for transferring kneaded ingredients from the kneading container 122 to the transfer base 144. In one or more embodiments, the mixing and kneading container 122 may be used for mixing the grounded flour and the liquid. In one or more embodiments, the mixing and kneading container 122 may be further used for kneading the mixture of the flour and the liquid to a dough. The dough may be deposited on the transfer base 144 (e.g., base of the mixing and kneading container 122) provided thereof using the vertical transfer unit 114.

The transfer sweeper 118 controlled through horizontal transfer unit 120 may be used for transferring the dough from the transfer base 144 to the surface of the lower platen 106 of the platen unit. In addition, the transfer sweeper 118 may also be used for transferring the cooked flat edible material 134 from the platen unit to the tray 130 provided thereof. In one or more embodiments, tray 130 may be any plate like structure provided by the user to collect the cooked and ready to eat flat edible material 134. In one or more embodiments, tray 130 is optional.

In one or more embodiments, the horizontal transfer unit 120 and the vertical transfer unit 114 may include a motor controlled through the processor 132. The apparatus 100 may be covered using an outer cover 126 designed thereof. In one or more embodiment, the outer cover 126 may be made of plastic. In alternate embodiment, the outer cover 126 may be made of a sheet metal material or any suitable material. In one or more embodiments, components (e.g., mixing and kneading container 122, dispensers, a segmented blade, etc.) of the apparatus 100 are detachable and can be detached for cleaning.

In one or more embodiments, the apparatus 100 described herein may perform a process of preparing a flat edible material with minimum user intervention. In one or more embodiments, the apparatus 100 described herein may use calculated amount of solid ingredient (e.g., flour) and liquid ingredient (e.g., water, oil) to generate a flat edible material. In one or more embodiments, the apparatus 100 described herein may prepare mixture of ingredients, knead the mixture, flatten the kneaded mixture and cook the flattened kneaded mixture to generate the flat edible material 134 (e.g., chapatis, rotis, biscuits). In one or more embodiments, the apparatus 100 described herein may be configured to self clean after the process of generation of the flat edible materials.

In one or more embodiments, the apparatus 100 described herein may be designed to be compact and portable. In one or more embodiments, the apparatus 100 described herein may enable the user to generate edibles of desired thickness, and in a desired cooked state (e.g., half cooked, fully cooked, roasted). In one or more embodiments, the apparatus 100 described herein may enable the user to control the number, quality, cooking temperature, size, and such other parameters of the edible by providing suitable values in the user interface of the control panel 128 and enabling the user to change these values as desired through the user interface of the control panel 128.

Figure 2:
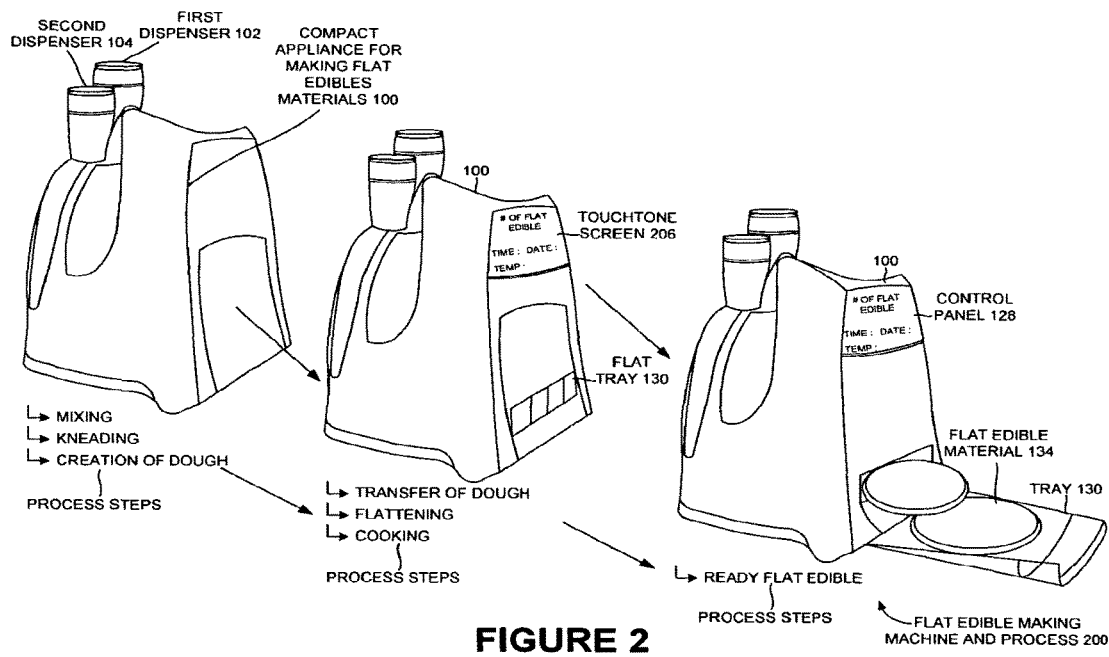
FIG. 2 is a diagrammatic process flow illustrating preparation of a flat edible, according to one or more embodiments.

FIG. 2 is a diagrammatic process flow illustrating preparation of a flat edible, according to one or more embodiments. As illustrated in FIG. 2, in one or more embodiments, a grounded edible material such as flour may be deposited in the first dispenser 102. Similarly, a liquid such as water may be deposited into the second dispenser 104. The grounded edible material and the liquid may be transferred proportionally to the mixing and kneading container 122 based on stored values in processor or user input. The grounded edible material and the liquid may be mixed by rotating a segmented blade controlled by the motor-140. In one or more embodiments, dough based on a mixture of grounded edible material and the liquid may be generated by kneading in the mixing and kneading container 122. Furthermore, the dough may be kneaded into any shape as desired by using an appropriate blade in the mixing and kneading container 122. The kneaded dough may be transferred to the transfer base 144 using the vertical transfer unit 114.

The dough on the transfer base 144 may be transferred to the platen unit by the transfer sweeper 118 controlled by the horizontal transfer unit 120. The platen unit may flatten the dough to a predetermined size (e.g., user may set the size or by usage of spacer) through application of pressure. Furthermore the flattened dough may be cooked to produce a flat edible material 134. The cooked flat edible material 134 may be transferred to the tray 130 by the transfer sweeper 118 controlled by the horizontal transfer unit 120. In one or more embodiments, the apparatus 100 may be controlled through the control panel 128 provided thereof. In one or more embodiments, the control panel 128 may include input unit and an output unit. In one or more embodiments, the input unit may be made of switches, keypads, knobs, etc. In one or more embodiments, the output unit may be a visual display, Liquid Crystal Display (LCD), etc. In one or more embodiment, the control panel 128 may be also made of input/output unit such as a touchtone screen 206 to obtain input from the user and to provide information as output (e.g., temperature). Also, in one or more embodiments, the control panel 128 may allow the user to set a cook time, a thickness of the flat edible, a number of flat edible materials, a cycle, a delivery time, type and/or brand of flour, an alarm and a status indicator. Furthermore, in one or more embodiments, the control panel 128 may be manually accessed (e.g., through user interface), wirelessly accessed and/or remotely accessed. The aforementioned units of the apparatus 100 may be explained in detail in further figures.

Figure 3:
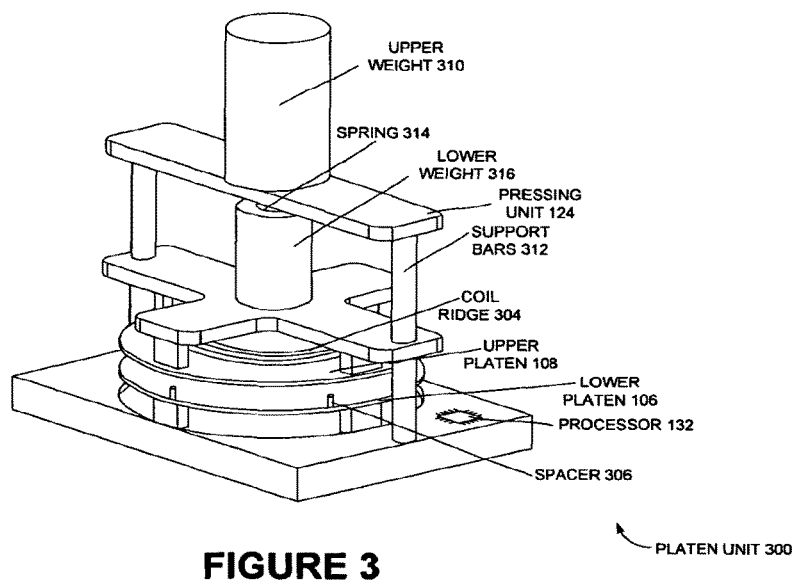
FIG. 3 is a perspective view of platen unit of the flat edible making apparatus, according to one or more embodiments.

FIG. 3 is a perspective view of platen unit 300 of the flat edible making apparatus 100 illustrated in FIG. 1, according to one or more embodiments. In one or more embodiments, the platen unit may be configured to generate flat edible material 134 of desired size. In one or more embodiments, the platen unit 300 may be controlled through a platen control module (not shown in figure). In one or more embodiments, the thickness or size for generating the flat edible material may be provided by the user through the control panel 128 or manually set using a spacer control module. The platen unit may include the upper platen 108 and the lower platen 106. In one or more embodiments, the surface of platens may be made of alloys of metals coated with nonstick coating. In the example embodiment, the upper platen 108 and the lower platen 106 may be mounted on a base and are held to supporting bars 312. In one or more embodiments, either of the upper platen 108 and the lower platen 106 or both may be enabled to rotate. The distance between the upper platen 108 and the lower platen 106 may be controlled through the upper weight 310 controlled by the platen control module.

In one embodiment, the upper weight 310 may be mounted on a supporting structure having the support bars 312. In one or more embodiments, the upper weight 310 may be an actuator or a motor or a weight. In one embodiment, when the upper weight 310 is an actuator or a motor, the upper weight 310 may be coupled to the upper platen 108 mechanically through a screw mechanism. In one or more embodiments, the movement of the upper platen 108 may be controlled by driving the actuator or a motor appropriately through the screw drive mechanism. In alternate embodiment, when the upper weight 310 is a physical weight, the upper weight 310 may be coupled to a spring 314. The spring 314 may be coupled to the lower weight 316. The lower weight 316 may be coupled to the upper platen 108. In alternate embodiment, the upper weight 310 may be a pneumatic or hydraulic system.

In one or more embodiments, the upper platen 108 may be physically displaced relative to the lower platen 106 by application of the pressure through the upper weight 310. In one or more embodiments, the upper weight 310 may exert pressure on the spring 314 and the lower weight 316 such that the upper platen 108 coupled to the lower weight 316 is moved towards the lower platen 106. In one or more embodiments, the upper platen 108 may be moved towards the lower platen 106 up to a predetermined distance to generate the flat edible of size (e.g., thickness) determined by the user. In the example embodiment, the upper platen 108 may be made to move along the support bars 312.

The thickness or size of the flat edible may be input by the user through the user interface of the control panel 128. Alternatively, a spacer 306 may be used in between the upper platen 108 and the lower platen 106 to set the size of the flat dough. In one or more embodiments, the spacer may be a pneumatic device or a metal pin (e.g., illustrated in FIG. 3). The spacer 306 may also be a variable spacer that can be controlled through a spacer control module.

In one or more embodiments, either of the upper platen 108 or the lower platen 106 or both may include coil ridges. In the example embodiment, the upper platen 108 and the lower platen 106 both include coil ridges (coil ridges not shown in figure for the lower platen 106). In one or more embodiments, a coil ridge 304 for the upper platen 108 may be below the surface of the upper platen 108 and coil ridges for lower platen 106 (not shown in figure) may be mounted below the lower platen 106.

The coil ridges may be used for heating the surface of platens. In one or more embodiments, the coil may be made of but not limited to Nichrome, Nickel-Iron, and stainless steel. The coils ridges in the platens may be powered to heat the surface of the platens to a predetermined temperature. In the example embodiment, the upper platen 108 may be heated more than the lower platen 106. Also, in one or more embodiments, temperature for the platens may be manually set by the user through the user interface of the control panel 128. Furthermore, in one or more embodiments, the temperature of the upper platen 108 and the lower platen 106 may be monitored by the platen control module using sensors (e.g., thermocouple) placed at appropriate locations in the platen units. The temperature data obtained from the sensors through sensor interfaces may be communicated to the temperature control module 90 I and the processor 132.

Furthermore, in the example embodiment, the surface of the upper platen 108 and the lower platen 106 may be flat. However, the surface of the platens may be shaped appropriately to generate an edible of desired shape, for example pizza crust. In one or more embodiments, the edible described herein may include but not limited to tortillas, crepes, and pizza crust.

Figure 8:
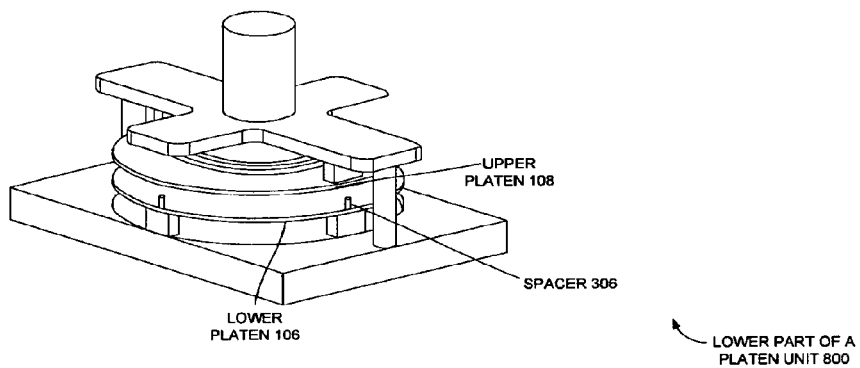
FIG. 8 is a perspective view of a platen unit of the flat edible making apparatus, according to one or more embodiments.

Furthermore, the support bars 312 and the pressing unit 124 may also be fitted with sensors such as position sensors, a position encoder and limit switches that communicate positional information of the upper platen 108 to the platen control module 920. The lower part of the platen unit is illustrated in FIG. 8.

Figure 4:
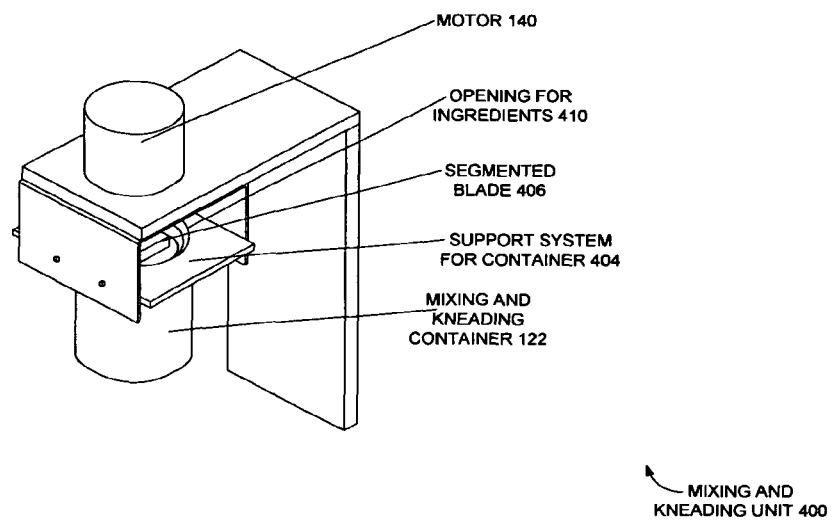
FIG. 4 is a perspective view of a mixing and a kneading unit of the flat edible making apparatus, according to one or more embodiments.

FIG. 4 is a perspective view of a mixing and a kneading unit 400 of the flat edible making apparatus 100 of FIG. 1, according to one or more embodiments. In one or more embodiments, the mixing and kneading unit 400 may include the mixing and kneading container 122, a support system for container 404, a segmented blade 406, a motor 140, and an opening for ingredients 410. In one or more embodiments, ingredients (e.g., flour, water, oil) from dispensers may be fed into the mixing and kneading container 122 through the opening for ingredients 410. In one or more embodiments, the opening 410 may be fitted with shutters if required, to avoid undesirable transfer of contents between the mixing and kneading unit 400 and the dispensing units. The ingredients may be mixed using a segmented blade 406. In one or more embodiments, the segmented blade 406 may be a mixing blade designed to have a first planar surface, a second planar surface and a raised surface to mix and knead the grounded edible material and the liquid material in the mixing and kneading container 122.

In one or more embodiments, the segmented blade 406 coupled to the motor 140 may be actuated by the motor 140. In one or more embodiments, the segmented blade 406 may be designed to effectively mix and knead the ingredients. Furthermore, in one or more embodiments, the motor 140 may be operated at varying speeds determined by the processor 132 in a process (e.g., software, algorithm) provided thereof. The mixing and kneading container 122 herein the example embodiment may be supported using the support system for container 404.

The mixing and kneading container 122 may be used for mixing and kneading the ingredients. In one or more embodiments, the mixing and kneading container 122 may have an opening at a bottom layer to transfer, the mixed ingredients to the transfer base 144. In one or more embodiments, the transfer base 144 may be configured as a base to the mixing and kneading container 122. In one or more embodiments, the transfer base 144 may be held tightly (e.g., by the vertical transfer unit) to the bottom of the mixing and kneading container 122 and adjusted appropriately (e.g., using o-rings at junction of the transfer base 144 and the mixing and kneading container 122) to ensure that there is no leakage. Furthermore, the mixed ingredients may be kneaded into a dough in the mixing and kneading container 122 (e.g., illustrated in FIG. 1) and dough may be generated. In one or more embodiments, the dough of optimal consistency may be generated by controlling a speed and rotations of the motor 140 based on feedback obtained by the processor 132.

The motor 140 described herein may be fitted with sensors such as rotary encoders and current sensors which provide information to the processor 132 through an interface thereof. In addition, the power consumed by the motor 140 may also be monitored by the processor 132 to determine quality of dough or liquid and grounded edible material required for mixing. However, accurate dispensing of the ingredients may be controlled based on feedback obtained through appropriate sensors and controls coupled to the dispensers to obtain dough of optimal consistency (e.g., automatic adjustment). In one or more embodiments, the user may also be allowed to specify an amount of grounded edible material and liquid to be dispensed or specify type and/or brand of flour (e.g., manual adjustment). The apparatus 100 described herein may be configured to generate one dough at a time through the mixing and a kneading unit 400 as compared to generation of a big dough as in conventional dough making process.

Figure 5:
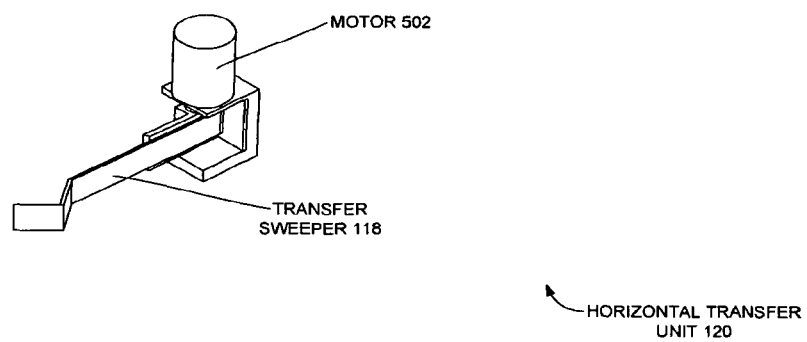
FIG. 5 is a perspective view of a horizontal transfer assembly of the flat edible making apparatus, according to one or more embodiments.

FIG. 5 is a perspective view of the horizontal transfer unit 120 of the flat edible making apparatus 100 of FIG. 1, according to one or more embodiments. The horizontal transfer unit 120 may include a motor 502, and the transfer sweeper 118. The transfer sweeper 118 may be controlled through the motor 502. In one or more embodiments, the motor 502 may be controlled by the processor 132 based on a process (e.g., determined based on a sequence, software, algorithm).

In the example embodiment, the transfer sweeper 118 may be configured to perform horizontal sweeping for two purposes: transfer of the dough from the transfer base 144 to the surface of the lower platen 106 and transfer of the cooked flat edible from the surface of the lower platen 106 to the tray 130. In one or more embodiments, the horizontal transfer unit 120 may be triggered to sweep the dough when the transfer base 144 reaches a predetermined height. In one or more embodiments, the horizontal transfer unit 120 may be configured to position the transfer sweeper 118 to a predetermined position so as to not to interfere with other process. In addition, the horizontal transfer unit 120 may include sensors such as limit switches or position encoders which may provide positional feedback to the processor 132.

Figure 6:
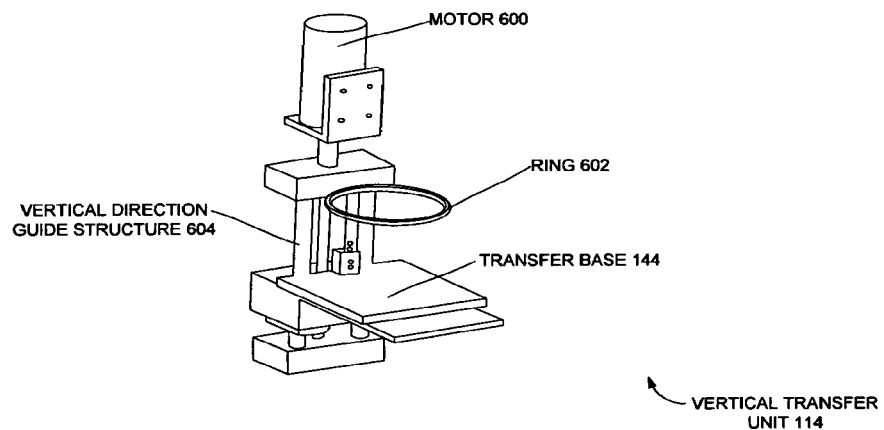
FIG. 6 is a perspective view of a vertical transfer unit of the flat edible making apparatus, according to one or more embodiments.

FIG. 6 is a perspective view of a vertical transfer unit 114 of the flat edible making apparatus 100 of FIG. 1, according to one or more embodiments. The vertical transfer unit 114 may include a motor 600, a ring 602 (optional) and a vertical direction guide structure 604. In one or more embodiments, the transfer base 144 is displaced by the motor 600 which may be controlled by the processor 132 based on a process (e.g., determined based on a sequence, software, algorithm). In addition, the vertical transfer unit 114 may include sensors such as limit switches or position encoders which may provide signals to the processor 132.

In one or more embodiments, the transfer base 144 may be a flat surface coupled to the vertical direction guide structure 604 used for receiving the dough. As mentioned herein, the transfer base 144 may also be configured as a base to the mixing and kneading container 122. In the example embodiment, the transfer base 144 may be moved on a vertical axis by the motor 600 along the vertical direction guide structure 604. In one or more embodiments, the vertical axis can be a screw-drive mechanism driven by motor 600. The optional ring 602 may be a used for scraping any ingredients sticking to the insides of the kneading container 122. In one or more embodiments, the optional ring 602 may be so designed to move closely along the inner sides of the kneading container 122 without making contacts with the segmented blade 406. Also, the ring 602 may be coupled to the vertical direction guide structure 604 such that the ring 602 moves with the transfer base 144. The ring 602 as described herein may be fixed at an appropriate height above the transfer base 144. In one or more embodiment, the ring 602 described herein may be an optional design feature.

Figure 7:
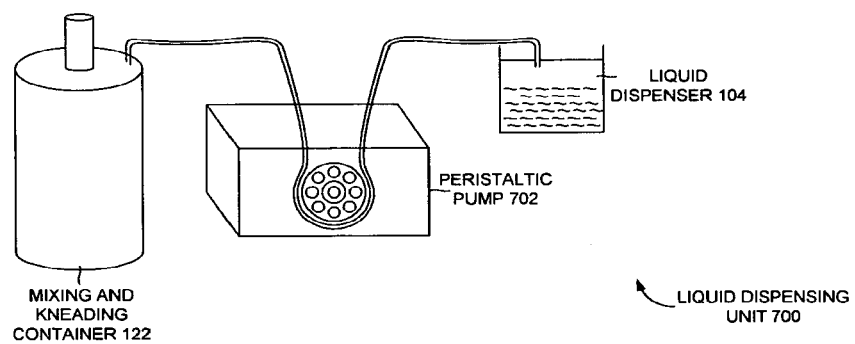
FIG. 7 is a perspective view of a liquid dispensing unit of the flat edible making apparatus, according to one or more embodiments.

FIG. 7 is a perspective view of a liquid dispensing unit assembly 700 of the flat edible making apparatus 100 of the FIG. 1, according to one or more embodiments.

Liquid from the second dispenser 104 may be dispensed controllably into the mixing and kneading container 122. In one or more embodiments, a sensor or controls may be used to control the amount of liquid dispensed from the second dispenser 104. In the example embodiment, a peristaltic pump 702 may be used to control the amount of liquid dispensed from the second dispenser 104. The peristaltic pump 702 may be fitted into the apparatus at an appropriate place. In one or more embodiments, the liquid may be released for specific iterations for mixing and kneading of the grounded edible material into a dough. Also, in one or more embodiments, liquid may be dispensed based on the resistance created while at mixing and kneading process. In alternate embodiments, other methods may also be employed for controllably dispensing the liquid. In one or more embodiments, the liquid dispenser 104 may be refilled as and when required.

FIG. 8 is a perspective view of a platen unit of the flat edible making apparatus 800 and the various parts are discussed under other figures.

Figure 9:
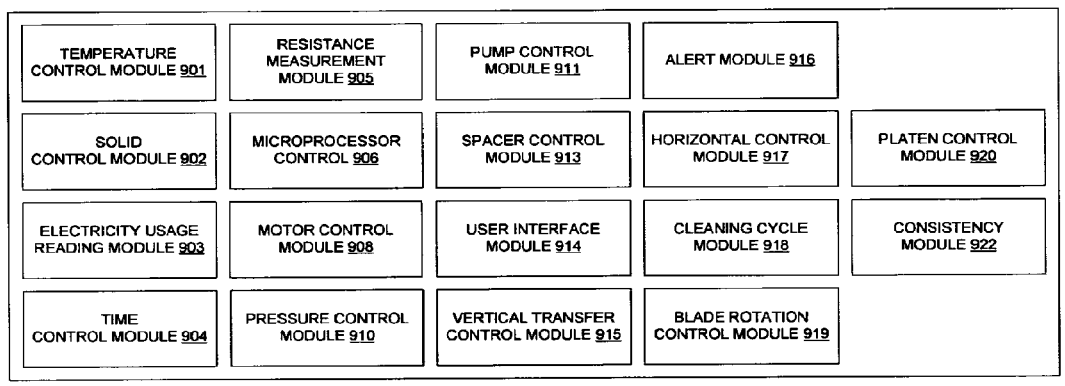
FIG. 9 is a schematic view of a processor module of the flat edible making apparatus, according to one or more embodiments.

FIG. 9 is a schematic view of a processor module 900 of the flat edible making apparatus 100 of FIG. 1, according to one or more embodiments. In particular, FIG. 9 includes a temperature control module 901, a solid control module 902, an electricity usage reading module 903, time control module 904, a resistance measurement module 905, a microprocessor control 906, a motor control module 908, a pressure control module 910, a pump control module 911, a spacer control module 913, a user interface module 914, a vertical transfer control module 915, an alert module 916, a horizontal control module 917, a cleaning cycle module 918, a blade rotation control module 919, a platen control module 920 and a consistency module 922.

In one or more embodiments, the temperature control module 901 may be configured to control the temperature of the platens. In addition, the temperature control module 901 may obtain temperature input from the user through the user interface of the control panel 128. The temperature input from the user may be applied to the platen unit through the temperature control module 901. Furthermore, the temperature control module 901 may also be configured to monitor the temperature of the platens. In one or more embodiments, the temperature control module 901 may monitor the temperature of the platens through sensors mounted therein. In alternate embodiment, the temperature control module 901 may heat the platens (e.g. through heating coils) to a default temperature in automatic mode (e.g., automatic adjustment). In yet another alternate embodiment, the temperature control module 901 may heat the platens (e.g. through heating coils) to a predetermined temperature in a custom mode. In one or more embodiments, the solid control module 902 may control the dispensing unit mounted to the dispensers to control the inflow of the grounded flour into the mixing and kneading unit 400.

In one or more embodiments, the electricity usage reading module 903 may be configured to monitor a usage of power consumption of the motor 140 of the mixing and kneading unit 400. In addition, the electricity usage reading module 903 may be configured to supply appropriate power to the motor 140 through the motor control module 908 based on the resistance determined through the resistance measurement module 905. In one or more embodiments, the time control module 904 may be configured to monitor time and to activate the resistance measurement module 905 to sense the resistance generated by the segmented blade 406 periodically to determine whether the dough being generated is of optimal consistency based on resistance provided. In addition, the time control module 904 may be configured to monitor timings of the process in the apparatus 100.

In one or more embodiments, the resistance measurement module 905 may be configured to measure the resistance in the rotation of the segmented blade 406 (coupled to motor 140). In addition, the resistance measurement module 905 may be configured to sense the resistance to determine the stages of generation of dough. Furthermore, the resistance measurement module 905 may be configured to communicate with the electricity usage reading module 903 and the motor control module 908 to halt the kneading operation when dough of optimal consistency is generated. In one or more embodiments, the segmented blade 406 may have a feedback mechanism. The feedback mechanism enables the motor control module 908 to provide sufficient electricity to generate sufficient torque for kneading the dough to an optimal consistency. In one or more embodiments, feedback mechanism may be implemented using sensors. In one or more embodiments, the microprocessor control 906 may be a module that initiates a system call or provides instructions or commands to hardware units of the apparatus 100 on communication from the processor 132.

In one or more embodiments, the motor control module 908 may be configured to control the motors (e.g., the motor 140, the motor 502, motor 600, the upper weight 310, etc.) in the apparatus 100. In one or more embodiments, the motor control module 908 may control each of the motor of the apparatus 100 based on a process (e.g., sequence controlled through software, algorithm) provided thereof. In one or more embodiments, the pressure control module 910 may be configured to control the pressure for generating a flat edible material of desired thickness. In one or more embodiments, the pressure control module 910 may be configured to control the pressure applied by the upper platen 108 on the dough.

In one or more embodiments, the pump control module 911 may be configured to control the peristaltic pump 702 to release adequate amount of liquid into the mixing and kneading unit 400. In one or more embodiments, the spacer control module 913 may be configured to control the spacer 306 to control the spacing between the platens. In one or more embodiments, the user interface module 914 may obtain input from the user for controlling the apparatus 100 and provides certain information (e.g., temperature, amount of flat edibles prepared) as an output. In one or more embodiments, the vertical transfer control module 915 may control the movement of the transfer base 144 on the vertical direction guide structure 604 of vertical transfer unit 114. In one or more embodiments, the alert module 916 may generate an alert when there is a shortage of grounded edible material in the first dispenser 102, shortage in liquid content in the second dispenser 104, a temperature variation, a current fluctuation, a cycle change for a mixing and a kneading function for making the dough, a clean cycle, an update cycle and a completion time. In one or more embodiments, the alert may be generated by the alert module 916 in one or more forms including but not limited to an audio alert and a light alert.

In one or more embodiments, the horizontal control module 917 may control the movements of the transfer sweeper 118 of the horizontal transfer unit 120. In one or more embodiments, the cleaning cycle module 918 may control cleaning operation of the apparatus 100. In one or more embodiments, a water heater may be coupled to the liquid dispenser. The water heater may generate hot water that may be forced into the mixing and the kneading container 122 to remove the sticking dough in the containers. The water with the residual material may be then collected by means of channel and stored in a storage bin (not shown in figure) under the apparatus. In one or more embodiments, the storage bin may be detached and cleared/cleaned by the user. In one or more embodiments, the blade rotation control module 919 may control the rotation of the segmented blade 406 through invoking the motor control module 908 when required to increase or decrease power input to the motor 140 coupled to the segmented blade 406.

In one or more embodiments, the blade rotation control module 919 may be communicatively coupled to the electricity usage reading module 903 and the motor control module 908 to coordinate and to control the operation of the segmented blade 406. In one or more embodiments, the platen control module 920 may control activities in the platen unit. In one or more embodiments, displacement of the upper platen 108 relative to the lower platen 106 may be controlled by the platen control module 920.

In one or more embodiments, the consistency module 922 may be configured to operate in an automatic mode (e.g., automatic adjustment) or in a manual mode (e.g., manual adjustment). In one or more embodiments, in automatic mode (e.g., automatic adjustment), the consistency module 922 may be configured to monitor and control the segmented blade 406 rotation to obtain dough of optimal consistency. In one or more embodiments, the consistency module 922 may obtain dough of optimal consistency through an automatic adjustment of an admixture of the liquid material and the grounded edible material and based on an electric property associated with a rotation of the segmented blade 406. In one or more embodiments, optimal consistency of the dough may be determined by reading the electricity usage of motor 140 coupled to the segmented blade 406. In one or more embodiments, the electricity usage of the motor 140 coupled to the segmented blade 406 may be monitored through the electricity usage reading module 903 periodically. If the electricity consumed by the segmented blade 406 is within a predetermined range of electricity consumption, then it is considered that dough with optimal consistency is generated. In one or more embodiments, the time corresponding to a step of generating the dough of optimal consistency may be optimized by supplying required electricity.

In one or more embodiments, user may also be enabled by the consistency module 922 to control dough generation process in the manual control mode (e.g., manual adjustment). In one or more embodiments, the consistency module 922 may enable the user to dispense the ingredients manually. In one or more embodiments, the user may be enabled to provide input through the user interface of the control panel 128 to dispense the ingredients as desired. The user may be enabled to use options in the control panel 128 to dispense the ingredients. In one or more embodiments, the consistency module 922 may be configured to control the segmented blade 406 rotation to knead the ingredients to obtain dough.

Also, in one or more embodiments, the apparatus 100 may provide a customizable option for the user to configure the apparatus to generate a dough of optimal consistency based on type and/or brand of flour. Input regarding dispensing of the quantity of the ingredients on type and/or brand of flour may be controlled based on statistical data. In one or more embodiments, based on statistical data, grounded flour to liquid proportion may be input (or configured) into the apparatus 100. For example, for a particular type and/or brand of flour, time for kneading, temperature required, amount of liquid to be dispensed, amount of flour to be dispensed, etc. may be manually configured in to a custom mode and stored into the apparatus 100. In one or more embodiments, the custom configuration may be stored in the memory of the apparatus as a preprogrammed control. In one or more embodiments, the custom mode configuration (e.g., based on flour brand) stored in the apparatus 100 may be invoked though the control panel 128 at any point of time. In one or more embodiments, upon invoking the custom mode configuration (e.g., or the manual adjustment) the flat edibles may be generated based on the customized of preconfigured mode. In other words, the configuration (e.g., for type and/or brand of flour) regarding amount of grounded edible and liquid to be dispensed (e.g., flour to liquid proportion) for an optimal dough for one serving, time for kneading, time for cooking, temperature for cooking, etc. may be known to the processor 132 in the manual mode or custom mode. In one or more embodiments, the processor 132 may enable generation of flat cooked edibles based on the configuration in the manual mode (e.g., manual adjustment) or in custom mode (e.g., based on preconfigured sequence).

In one or more embodiments, the modules described herein may be programmed or hardwired into the apparatus 100 through appropriate means. In one or more embodiments, the one or more modules may be programmed as a software stored in a memory of the apparatus 100 or implemented as hardware in the apparatus. In one or more embodiments, the memory may be a volatile memory or a non-volatile memory. In one or more embodiments, the software program stored in the memory of the apparatus 100 may be executed by an operating system of the apparatus 100. In one or more embodiments, the operating system may be a real-time operating system. In one or more embodiments, the operating system may execute the software in the memory using the processor 132.

Furthermore, the operating system may communicate a system call to the hardware units (e.g., motors, sensors) of the apparatus 100 through a device driver provided thereof. The device driver (e.g., a driver software and/or a driver circuit) may drive the hardware units of the apparatus 100 accordingly. In one or more embodiments, the apparatus 100 may include other modules and circuitry required for the operation of the apparatus 100. In addition, the operating system may also output information such as time consumed, number of edibles prepared, etc. through a display in the control panel 128.

In one or more embodiments, the processor 132 may communicate a system call (e.g., commands, instructions) to hardware devices (e.g., control wheel 1204 of the dispenser, actuator, motor or pump of the dispensers, motor 600, motor 140, motor of horizontal transfer unit 120, upper weight 310, etc.) to perform respective operations based on a sequence programmed into the apparatus. The quantity of ingredients to be input to the apparatus 100 may be controlled through the processor 132. In one or more embodiments, a predetermined quantity of ingredients may be released into the mixing and kneading container 122. The segmented blade coupled to the motor 140 may be rotated through the motor 140 to mix and knead the mixed ingredients. Power consumption at regular intervals may be recorded through the electricity usage reading module 903. In one or more embodiments, there may be variable power consumption by the motor 140 at different stage of formation of dough. Based on power consumption (e.g., based on torque/resistance) the processor 132 may control the peristaltic pump 702 or a dispensing wheel of the dispenser to release calculated quantity of ingredients to compensate any shortage or to balance any additional quantity in the mixing and kneading container 122. In one or more embodiments, the aforementioned step may be an iterative step.

The quantity of ingredients are calculated and carefully released into the mixing and kneading container 122, the ingredients are mixed and kneaded up to a point where dough of optimal consistency is obtained. In one or more embodiments, the point where dough of optimal consistency is obtained may be determined by power consumption reading through the electricity usage reading module 903. In one or more embodiments, the processor 132 may stop the mixing and kneading process upon determining that dough of optimal consistency is prepared.

In one or more embodiments, the aforementioned steps as described herein is devised to perform any corrections due to extra addition of any of the ingredients. In addition, the aforementioned steps may be performed by the apparatus to balance quantities when there is an imbalance or shortage in the mixing and kneading container 122. In one or more embodiments, the apparatus 100 as described herein may be configured to generate a dough of optimal consistency regardless of accidental release of ingredients or due to machine errors. For example, additional quantity of flour may be dispensed if the mixture has liquid content more than required or additional liquid may be dispensed it the mixture has solid content more than required. The apparatus 100 described herein may be configured to detect each of such states and to perform corrective steps to obtain dough of optimal consistency. In addition, the apparatus 100 solves the problem of user who may not know quantities of ingredients to be added for preparing an edible. Alternatively, the apparatus 100 is also designed to enable user to control the formation of dough. In one or more embodiments, the user may be provided with a manual option (e.g., custom mode) to control the apparatus 100 through the user interface of the control panel 128 to prepare dough. For example, a user may want to prepare a dough using quantities of solid grounded materials and liquid that is variable from standard quantities. The user may set the apparatus 100 into a manual mode (e.g., manual adjustment) through the user interface of the control panel 128. In one or more embodiments, the user may be enabled to input type and/or brand of flour with input regarding quantity of ingredients (e.g., flour, liquid, etc.) to be dispensed as a custom mode. The user may manually control the dispensing of the ingredients into the mixing and kneading container 122 through controls provided in the control panel 128.

The mixing and kneading process may be substantially same as in automatic mode. However, the mixing and kneading process may be continued until the kneading operation is completed based preprogrammed sequence stored on processor 132 based on user input of type and/or brand of flour. In one or more embodiments, the custom mode may be saved in the apparatus 100.

In addition, the processor 132 may control and drive the other hardware units in the apparatus 100 therein. In one or more embodiments, a sequence of steps may be performed by the processor 132 based on the program being stored in the memory of the apparatus 100. In one or more embodiments, each of the steps may be timed appropriately.

Figure 10:
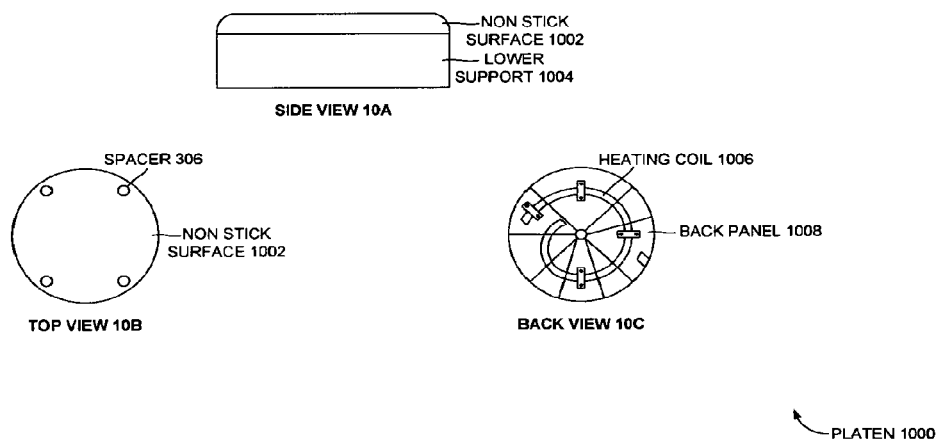
FIG. 10 illustrates different views of a platen of the flat edible making apparatus, according to one or more embodiments.

FIG. 10 illustrates different views of one of a platen 1000 of the flat edible making apparatus 100, according to one or more embodiments. Side view of the platen may illustrate a non-stick surface 1002, and a lower support 1004. In one or more embodiments, the surface of the platen may be made of a non-stick material. In one or more embodiments, the upper platen 108 may be substantially same as the lower platen 106 in size and shape. However, in one or more embodiments, the size and shape may be varied as per requirements. Top view of the platen illustrates a non-stick surface 1002 and spacers 306. Back view 10C of the platen illustrates back panel 1008 with heating coil 1006 attached.

Figure 11:
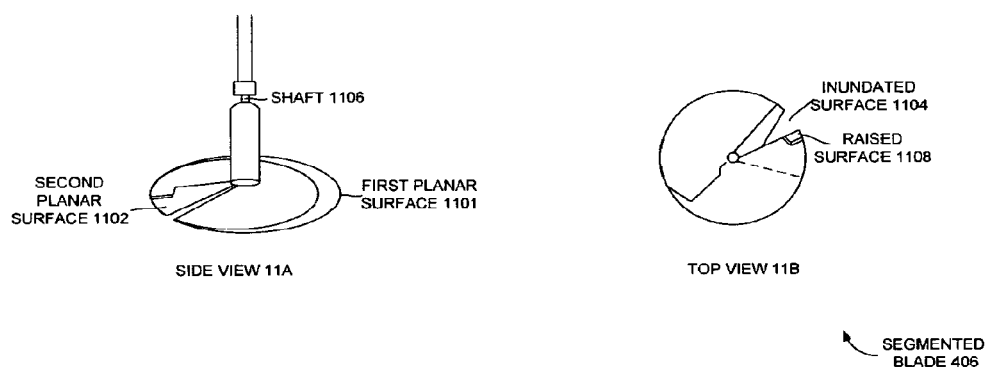
FIG. 11 illustrates different views of a segmented blade of the flat edible making apparatus, according to one or more embodiments.

FIG. 11 illustrates different views of a segmented blade 406 of the flat edible making apparatus, according to one or more embodiments. In one or more embodiments, the segmented blade 406 may be coupled to a shaft 1106 to couple with the motor 140.

The segmented blade 406 may have a first planar surface 1101 and a second planar surface 1102. In addition, the segmented blade 406 may also include a raised surface 1108 as a part of design. The segmented blade 406 as described herein is so designed to mix the ingredients, and to knead the ingredients to produce dough of optimum consistency and shape and also prevent sticking. Though the design as described herein is used, other design may be used as well.

Figure 12:
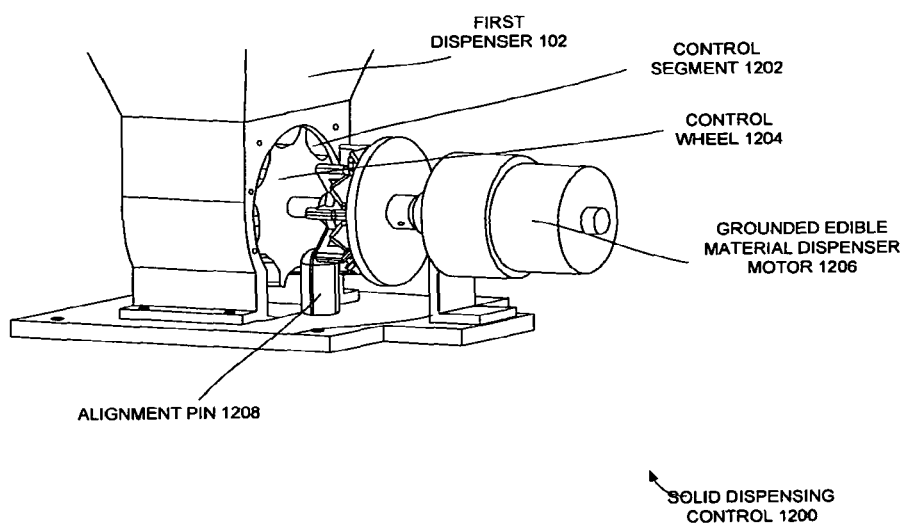
FIG. 12 is a perspective view of a solid dispensing control of the flat edible making apparatus, according to one or more embodiments.

FIG. 12 is a perspective view of a solid dispensing control 1200 of the dispenser of the flat edible making apparatus 100 of FIG. 1, according to one or more embodiments. In one or more embodiments, the solid dispenser or the first dispenser 102 may include a solid dispensing control 1200 to accurately dispense grounded flour into the mixing and kneading unit 400. In one or more embodiments, the dispensing control 1200 may include a control segment 1202, a control wheel 1204, a dispenser motor 1206 and an alignment pin 1208. The control wheel 1204 may be a specially designed wheel with several control segments 1202. Each segment therein may be designed to hold a specific quantity of solid grounded edible material. In one or more embodiments, the dispensing control 1200 may be coupled to the dispenser such that the grounded edible material is directly directed in to one or more control segment 1202 of the control wheel 1204. Furthermore, the control wheel 1204 is rotated by the dispenser motor 1206 so that the solid grounded edible is transferred into the mixing and kneading container 122 coupled to the dispenser.

In one or more embodiments, the control wheel 1204 may be controlled by the dispenser motor 1206. In one or more embodiments, the dispenser motor 1206 may be controlled through the motor control module 908 and the solid control module 902 which are further controlled by the processor 132. In one or more embodiments, the dispenser motor 1206 may be controlled to rotate the control wheel 1204 so as to dispense calculated quantity of grounded edible material. In one or more embodiments, alignment pin 1208 may be used for aligning the control wheel 1204 with the motor 1206 of the dispenser while coupling back to the apparatus 100 after the entire dispenser is detached for washing. In one or more embodiments, the dispenser 102 may be refilled appropriately when required.

Figure 13:
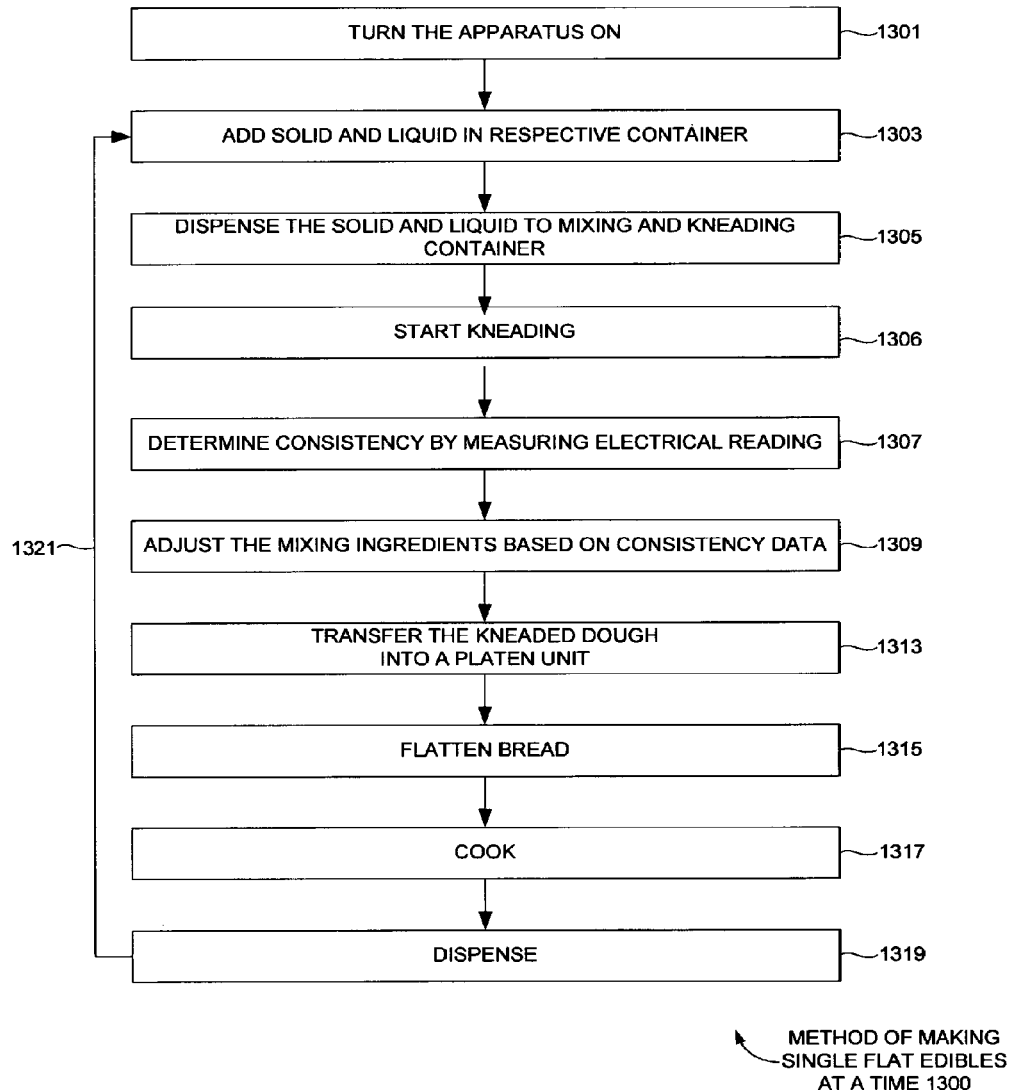
FIG. 13 is a process flow of generating a single flat edible at a time, according to one or more embodiments.

FIG. 13 is a process flow of generating a single flat edible at a time 1300 using the apparatus 100, according to one or more embodiments. In operation 1301, the apparatus 100 may be turned on. In operation 1303, solid (e.g., flour) and liquid (e.g., water, oil) may be added into respective dispensers. In one or more embodiments, an input may be obtained from the user such as number of flat edibles required, size of the flat edible (e.g., thickness), temperature, type and/or brand of flour etc. In one or more embodiments, quantity of ingredients may be checked by means of sensors (e.g., strain gauge, etc.) in the dispenser to determine sufficiency of ingredients to generate number of flat edibles as requested by user. If the quantity is determined to be less for the generating number of flat edible materials, then an alert may be generated and shortage may be indicated at the output unit of the control panel 128. Furthermore, in one or more embodiments, the platens may be heated to a temperature set by the user. Furthermore, the transfer base 144 may be raised (e.g., using the vertical transfer unit 114) from an initial position to form a bottom of the kneading container 122.

The amount of ingredients to generate a single flat edible may be calculated based on type and/or brand of flour (proportion of flour to water for optimal dough formation is function of composition of flour material which changes with type and/or brand of flour used) either by user input or by default values stored in processor and in operation 1305, a controlled amount of solid ingredient and the liquid ingredient may be dispensed into the mixing and kneading container 122. In one or more embodiments, the amount of ingredients may be calculated based on size and thickness of the flat edible input by the user. Mixing operation may be performed to mix the ingredients. In one or more embodiments, the motor 140 may be activated by the motor control module 908 through the processor 132 to perform mixing and kneading operation (e.g., using the segmented blade 406). Based on input obtained from the resistance measurement module 905, the speed of the segmented blade 406 may be controlled (e.g., using the blade rotation control module 919) by controlling the motor 140 based on pre-programmed time for optimal mixing and kneading of the ingredients. Alternatively, data obtained from various optional sensors like actuator current sensor, torque sensor, etc. positioned in the mixing and kneading unit 400 may be used as a feedback to control the speed of the segmented blade 406.

In operation 1306, kneading may be performed. Also, in one or more embodiments, dough may also be prepared in a preprogrammed mode. In one or more embodiments, in preprogrammed mode, the values for blade rotation power consumption/speed etc., timing and sequence of moving transfer base 144 relative to mixing and kneading unit 400 and the segmented blade 406 rotation may be obtained from a custom mode stored in the memory of the apparatus 100.

In operation 1307, consistency of the dough may be determined by measuring electrical reading (e.g., electrical reading while kneading dough of optimal consistency may be taken at testing stage of product). In operation 1309, mixing of ingredients may be adjusted (e.g., quantity to generate an optimal dough may be input into the apparatus 100) based on consistency data. In operation 1313, the kneaded dough may be transferred from transfer base 144 to lower platen 106 by the transfer sweeper 118 controlled by the horizontal transfer unit 120. In one or more embodiments, the kneaded dough may be dispensed on the transfer base 144 from the kneading container 122. In one or more embodiments, the motion of the segmented blade 406 may be stopped before, during or after the downward motion of the transfer base 144. Furthermore, the ring 602 in the vertical transfer unit 114 may be moved into the kneading container 122 to, scrape any sticking dough in the insides of the mixing and kneading container 122.

The transfer base 144 carrying the dough may be moved to a preconfigured position by the vertical transfer unit 114. Furthermore, the horizontal transfer unit 120 may be triggered to push the dough to the surface of the lower platen 106 of the platen unit through the transfer sweeper 118. Further, the transfer base 144 may be moved to a predetermined position (e.g., by the vertical transfer unit 114) to form a base of the mixing and kneading container 122 for next dough preparation. The horizontal transfer unit 120 may be activated to transfer the transfer sweeper 118 back to the original position to prevent obstruction in the flattening process in the platen unit.

In operation 1315, the dough for one serving of flat edible may be flattened.

The platen unit is then activated to flatten the dough to generate a flat edible of desired thickness and size. Pressure may be applied by the upper platen 108 to flatten the dough.

In operation 1317, the flattened dough for one serving of flat edible may be cooked to a flat edible material. In one or more embodiments, the flattened dough for one serving of flat edible may be cooked at temperature provided by user (e.g., preprogrammed by the user) or at a default temperature or at a preconfigured temperature for a specified amount of time. In operation 1319, the cooked edible may be dispensed. In one or more embodiments, the horizontal transfer unit 120 may be activated to transfer the cooked flat edible to the tray 130 through the motion of the transfer sweeper 118. Furthermore, the process may be restarted until the number of flat edible materials is per the request of user is generated. In one or more embodiments, the apparatus 100 may also be configured to generate flat edibles of various thickness and size.

Figure 14:
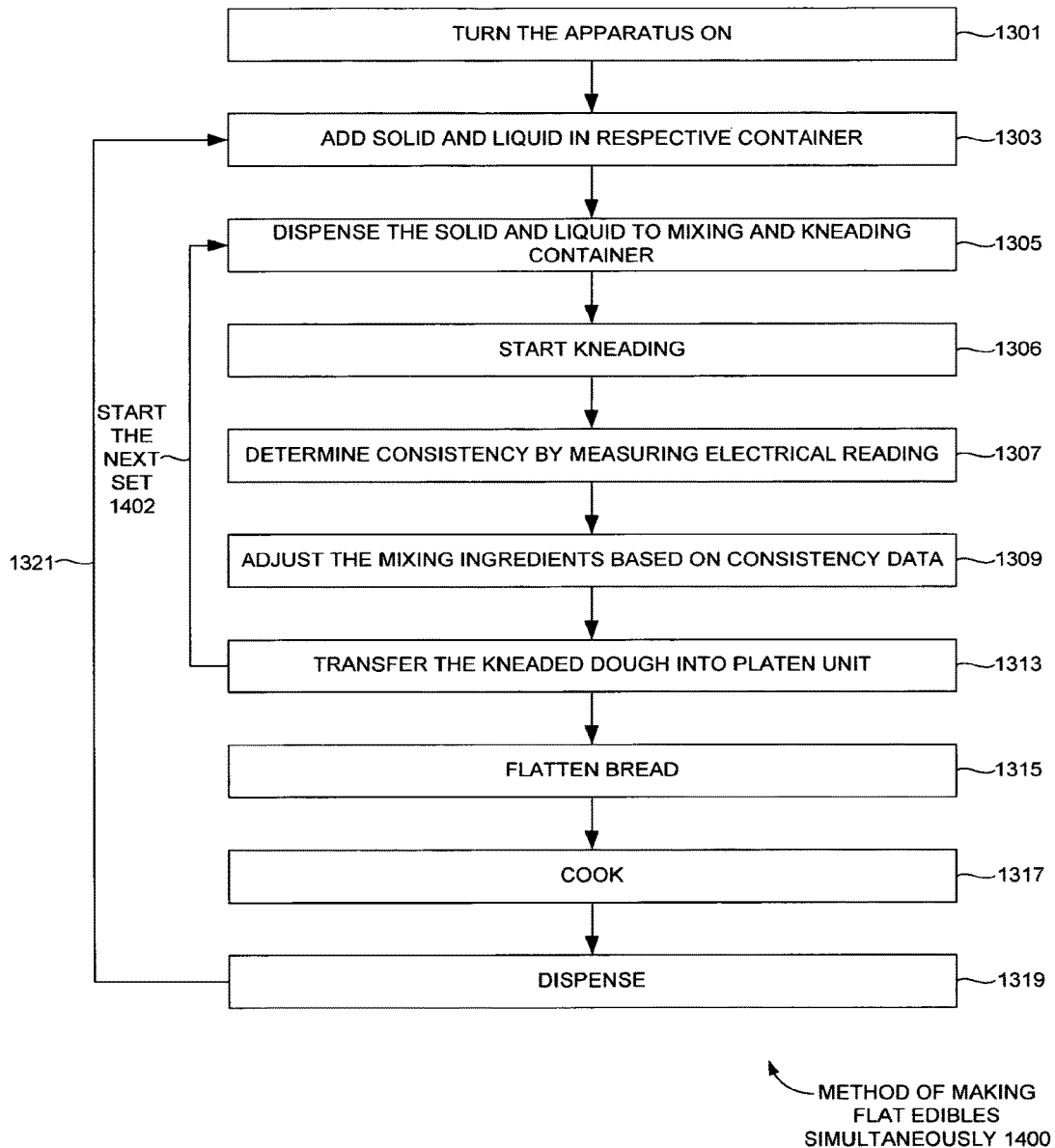
FIG. 14 is a process flow of generating simultaneous flat edibles, according to one or more embodiments.

FIG. 14 is a process flow of generating simultaneous flat edibles 1400, according to one or more embodiments. In operation 1301, the apparatus 100 may be turned on. In operation 1303, solid (e.g., flour) and liquid (e.g., water, oil) may be added into respective dispensers. In operation 1305, the solid and liquid may be dispensed into the mixing and kneading container 122. The ingredients may be mixed. In operation 1306, kneading may be performed in the mixing and kneading container 122. In operation 1307, consistency of the dough may be determined by measuring electrical reading (e.g., electrical reading while kneading dough of optimal consistency may be taken at testing stage of product). In operation 1309, ingredients to be mixed may be adjusted (e.g., quantity to generate an optimal dough may be input into the apparatus 100) based on consistency data. In operation 1313, the kneaded dough may be transferred to a transfer base 144 which is lowered (e.g., by the vertical transfer unit 114) and then transferred to a lower platen 106 by a transfer sweeper 118. Once the dough is dispensed, the transfer base 144 may be moved to a pre-determined position (e.g., by the vertical transfer unit 114) to form a base of mixing and kneading container 122. Furthermore, operation 1305 may be initiated to generate dough for one serving of flat edible simultaneously while operation 1315 is being performed. In operation 1315, the dough for one serving of flat edible may be flattened. In operation 1317, the flattened dough for one serving of flat edible may be cooked as flat edible material. In operation 1319, the cooked flattened edible material may be dispensed. As soon as one cooked flat edible is dispensed on the tray 130 by operation 1319, dough which was prepared simultaneously is ready to be dispensed onto the lower platen unit by operation 1313, The process may be continued until all the solid and liquid in the dispensers are emptied or the number of flat edibles based on user input are dispensed. Once the solid and liquid are emptied, the operation 1303 may be initiated.

Figure 15:
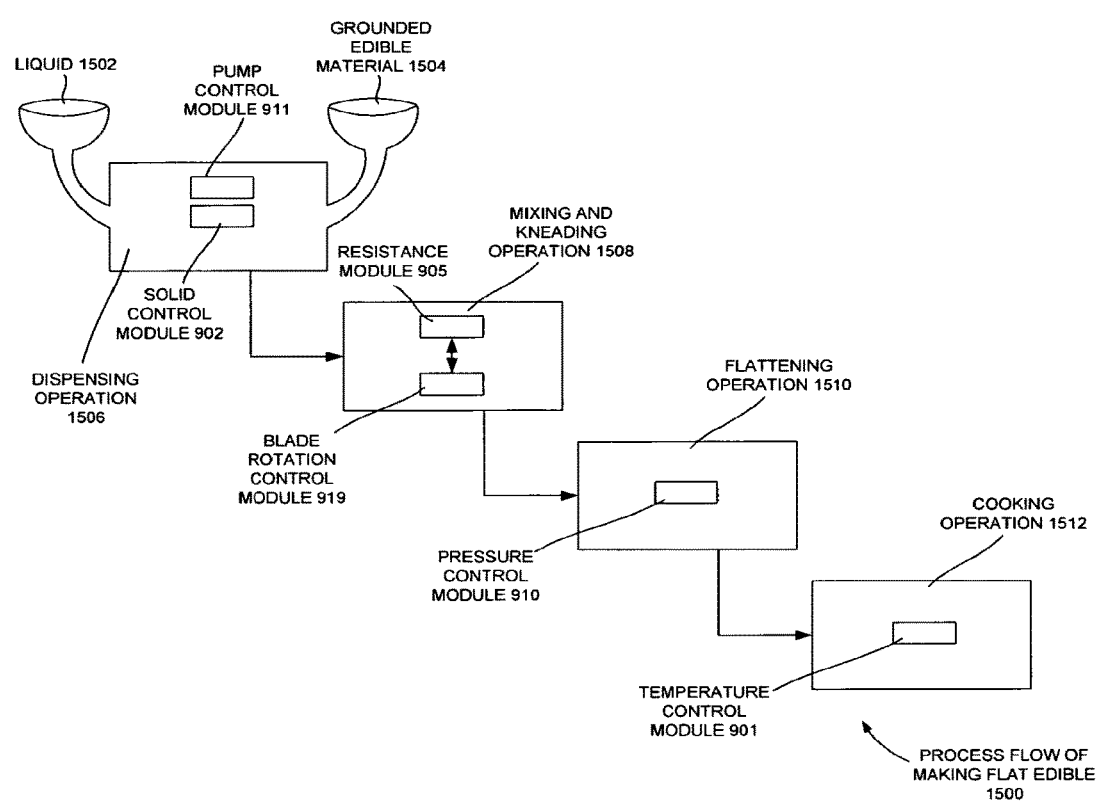
FIG. 15 is a pictorial process flow of generating edibles, according to one or more embodiments.

FIG. 15 is a pictorial process flow of generating flat edibles 1500, according to one or more embodiments. As mentioned in above process, a liquid 1502 and a grounded edible material 1504 may be dispensed to the mixing and kneading container 122 controlled through pump control module 911 and solid control module 902. In one or more embodiments, the resistance of the segmented blade 406 for rotation due to formation of dough may be measured using the resistance measurement module 905.

Furthermore, required power may be supplied to the motor 140 controlling the segmented blade 406 through the blade rotation control module 919 to ensure sufficient torque to the motor 140 controlling the segmented blade 406 to mix the liquid 1502 and the grounded edible material 1504 in the mixing and kneading container 122. The mixture of the liquid 1502 and the grounded edible material 1504 may be kneaded to dough in a mixing and kneading operation 1508. The dough may be transferred to the lower platen 106 from the transfer base 144 using the transfer sweeper 118. In one or more embodiments, the movement of transfer base 144 may be controlled through the vertical transfer unit 114.

In one or more embodiments, the transfer sweeper 118 may be controlled through the horizontal transfer unit 120. The dough may be flattened using the flattening operation 1510 in the platen unit 300. The pressure control module 910 implemented in the upper weight 310 may control the pressure of the platen unit required to flatten the dough to the required thickness. The flattened dough may be cooked in the cooking operation 1512 in platen unit at controlled temperature controlled through temperature control module 901.

Figure 16:
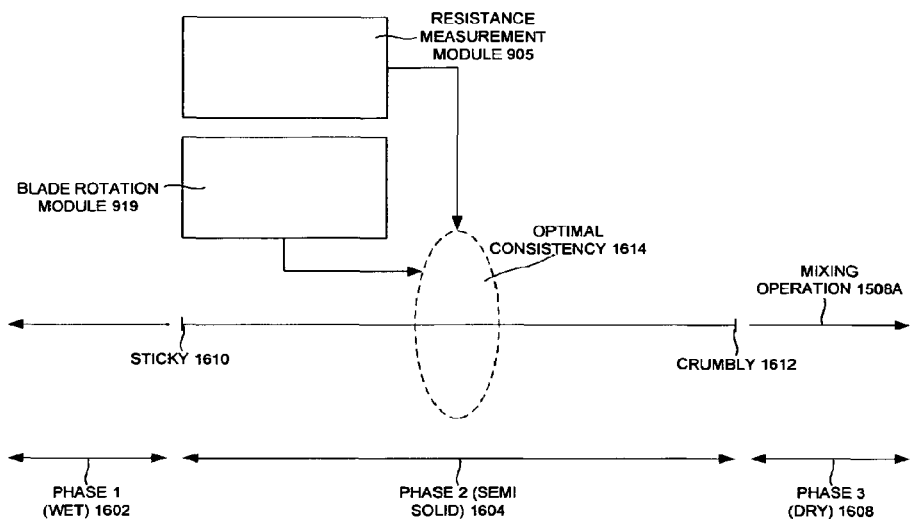
FIG. 16 is a pictorial view illustrating phase wise operations of mixing operation illustrated in FIG. 15, according to one or more embodiments.

FIG. 16 is a pictorial view illustrating phase wise operations of mixing operation 1508A, according to one or more embodiments. In one or more embodiments, the transfer base 144 may be moved by the motor 600 on vertical direction guide structure 604 to be coupled as a base to the mixing and kneading container 122. In phase I, 1602, a liquid and a grounded edible material may be dispensed (e.g., automatic adjustment or through manual adjustment) to the mixing and kneading container 122 to generate a sticky mixture 1610. In one or more embodiments, phase I 1602 may be called as wet phase. In phase II 1604, the resistance of the segmented blade 406 for rotation due to formation of dough may be measured using the resistance measurement module 905 (e.g., in automatic adjustment mode). Furthermore, required power may be supplied to the segmented blade 406 through the blade rotation control module 919 to ensure sufficient torque to the segmented blade 406 to continue generation of a dough (in semi-solid state) of optimal consistency 1614. In one or more embodiments, the phase II 1604 may be called as semi-solid phase. In phase III 1608, the mixing operation is continued until crumbly dough 1612 is generated. In one or more embodiments, phase III 1608 may be called as dry stage.

Power consumption at regular intervals may be recorded through the electricity usage reading module 903. In one or more embodiments, there may be variable power consumption by the motor 140 at different stage of formation of dough (e.g., due to variable resistance in rotation of the motor 140 while kneading the dough). Based on power consumption (e.g., based on resistance offered by the rotation of motor 140) the processor 132 may control the peristaltic pump 702 or a dispenser motor 1206 of the dispenser to release calculated quantity of ingredients to compensate any shortage or to balance any additional quantity in the mixing and kneading container 122. In alternate embodiments, generation of optimal consistency of the dough may also be controlled manually (e.g., in manual adjustment mode) by the user based on preconfigured sequence related to type and/or brand of flour known to processor (e.g., customized).

Figure 17:
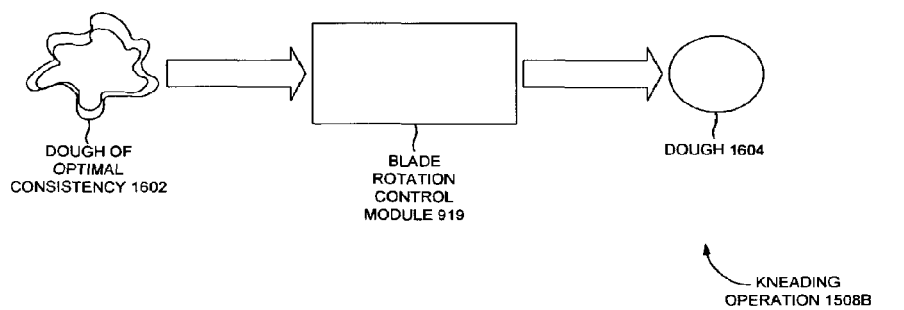
FIG. 17 is a pictorial process flow illustrating kneading operation, according to one or more embodiments.

FIG. 17 is a pictorial process flow 1508B illustrating continuation of FIG. 16 illustrating additional operations for generation of dough, according to one or more embodiments. Further to operations in FIG. 16, kneading process is initiated to generate a dough of optimal consistency 1602. The resistance caused while kneading may be sensed and observed by the resistance measurement module 905. The blade rotation control module 919 may invoke the motor control module 908 to supply for more power to maintain necessary torque. In addition, the power consumed by the motor 140 may be observed by the electricity usage reading module 903 and power through the motor control module 908 may be provided to ensure sufficient power supply to maintain torque. The process may be continued till dough of optimal consistency is generated.

Figure 18:
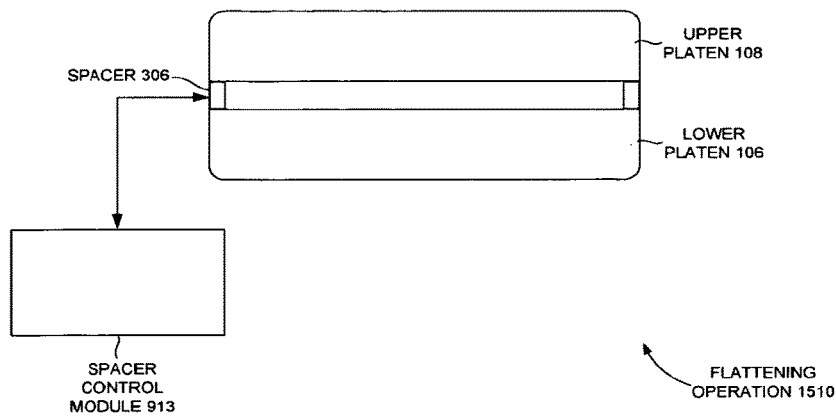
FIG. 18 illustrates a flattening operation, according to one or more embodiments.

Alternatively, in manual mode (e.g., manual adjustment), the kneading operation may be continued based on preconfigured timing and sequence configured in the custom mode based on type and/or brand of flour. The dough thus prepared may be transferred to the platen unit. FIG. 18 illustrates the flattening operation 1510 of FIG. 15, according to one or more embodiments. The dough for one serving of flat edible may be flattened through the flattening operation 1510 using the platens of the platen unit. The spacer 306 may be used in between the upper platen 108 and the lower platen 106 to generate a flat edible with desired thickness. In one or more embodiments, the spacer 306 may be controlled using the spacer control module 913.

Figure 19:
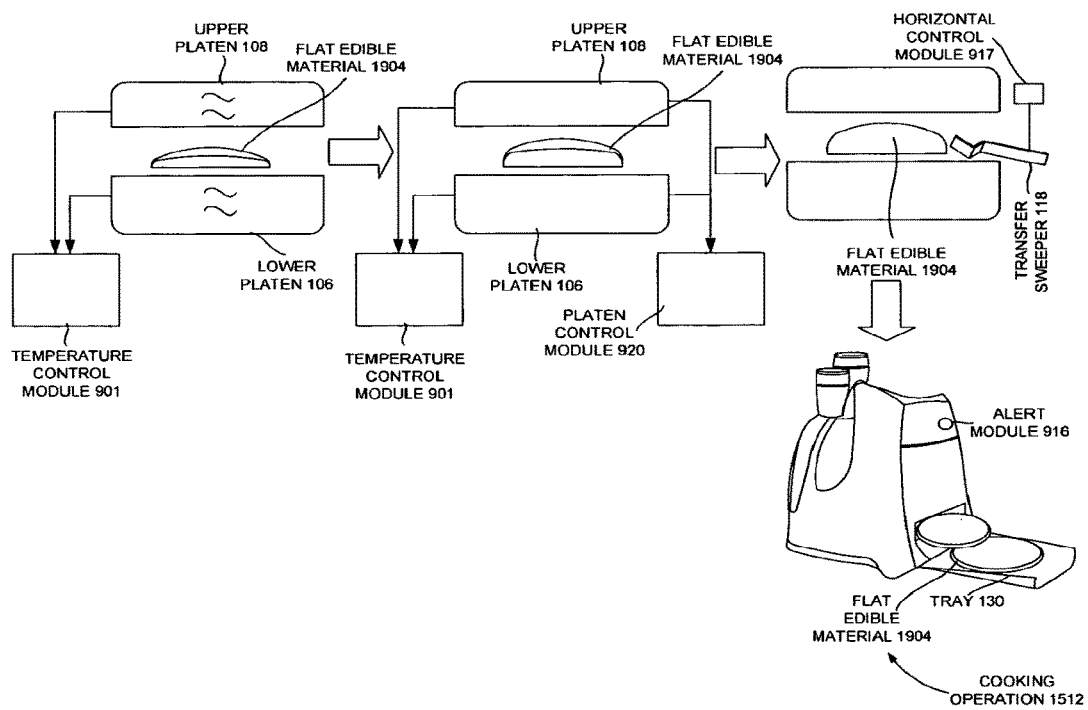
FIG. 19 is a pictorial process flow illustrating a cooking operation, according to one or more embodiments.

FIG. 19 is a pictorial process flow illustrating the cooking operation 1512 of FIG. 15, according to one or more embodiments. The flattened dough may be cooked into a flat edible material 1904 in the cooking operation 1~12 using platens at controlled temperature controlled through temperature control module 901 (e.g., default, preprogrammed, or user provided temperature). In the example embodiment, the upper platen 108 may be heated to a temperature higher than as compared to the temperature of the lower platen 106. The movement of platens may be controlled through the platen control module 920 based on pressure developed by swelling of the flat edible material.

In one or more embodiments, as the flat edible material is cooked, it is transferred to the tray 130 by the transfer sweeper 118. Furthermore, an alert is generated to indicate the user that a flat cooked edible is prepared.

In one or more embodiments, the cooking process as described herein may constitute of several steps. In one or more embodiments, the upper platen 108 may be heated to a temperature higher than as compared to the temperature of the lower platen 106 to ensure sufficient cooking of the edible. The upper platen 108 may be first moved close to the lower platen 106 initially for flattening the dough for one serving of flat edible based on the input provided by the user (e.g., through the user interface) or based on pre-programmed sequence.

In a further step, the upper platen 108 after a prescribed time may be moved away from the flattened dough for a specific distance to continue cooking process through radiation of heat. Further, in next step, the upper platen 108 may be moved towards the lower platen 106 to make contact with the cooking flattened dough. The upper platen 108 may be moved one or more times towards and against the cooking flattened dough to ensure proper cooking of the flattened dough. In one or more embodiments, second contact movement as described above may emulate a puffing process (e.g., for soft edible product such as chapati, roti, tortilla, etc.) of the edible as performed in conventional cooking process (e.g., as in manual cooking). The contact movements as described above may also serve for cooking an upper layer of the edible (e.g., for both soft edible like chapati and hard edible like biscuit).

The aforementioned steps may eliminate a need of flipping process of the edible while in cooking to ensure proper cooking as compared to conventional cooking process. The upper platen 108 is heated to a temperature higher than as compared to the temperature of the lower platen 106 to ensure sufficient cooking of the edible as the upper platen 108 does not have contact with the edible all the time. Other methods for cooking the flattened dough may be used as well.

In one or more embodiments, the dispensers as described in the apparatus 100 may be replaced by attachments connecting to pipelines, enabling a continuous input of ingredients, thereby enabling a continuous production process. Also, in one or more embodiments, mixture of ingredients may be used in a dispenser instead of single ingredient. Also, in one or more embodiments, the functioning of the storage/dispensing unit and the mixing and kneading unit 400 may be intermixed with each other for production of better dough. For example, the motor 140 may be started before dispensing of the ingredients, or ingredients may be dispensed at intermediate times during the operation of the motor 140. In one or more embodiments, the aforementioned sequence may be programmed into the apparatus 100 or may be initiated through the control panel 128 based on inputs obtained from the mixing and kneading unit 400 during operation or may be reading obtained from the consistency module 922. Also, in one or more embodiments, the lower platen 106 may be replaced with a rotating carousel with multiple platens, or a single rotating disc. This feature may allow production of multiple edible products in parallel, with few edible products being pressed while another edible product is being prepared. This embodiment may require multiple instances of the horizontal transfer unit 120. Also, in one or more embodiments, the upper platen 108 and the lower platen 106 may be formed in different shapes instead of the flat surfaces as depicted in the aforementioned embodiments. For example, the platens may have circular depressions in them to form dough in a shape of a bagel or pizza crusts or other edibles which have a physical form similar to flat edibles. Alternately, the pressing mechanism including the upper platen 108, the support bars 312 and upper weight 310 may be replaced by a rolling pin system for flattening the dough. In one or more embodiments, the apparatus 100 is fully automated, compact, and portable appliance.

The apparatus 100 described herein is compact and may include all the units as described herein under the apparatus 100. Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:
1. A method of making a cooked single flat edible, comprising:
   filling a first dispenser with a grounded material,
   filling a second dispenser with a liquid;
   dispensing the flour and the liquid into a kneading unit to make a dough using a software to calculate the dispensing of the flour and the liquid;
   mixing a grounded edible material and a liquid using the kneading unit having a segmented blade to make the dough for at least one serving of the flat edible;

controlling an inflow of the grounded edible material and the liquid to obtain an optimal consistency of the dough for one serving of the flat edible; and flattening the dough for one serving of the flat edible to make one serving of the flat edible with a pressure mechanism between an upper platen and a lower platen;

making a flat edible material by heat cooking the flat edible material positioning a spacer between the upper platen and the lower platen to flatten the dough for one serving of flat edible material to a desired thickness; and heating the upper platen and the lower platen; and cooking the flat edible material and producing the cooked single flat edible as an end product.

2. The method of claim 1, further comprising:

creating a sequence of steps through a processor to make the dough for one serving of the flat edible; and timing the sequence of steps to perform a specific task; and optimizing a time of a step corresponding to a resistance reading by a change in current based on the dough consistency, wherein the sequence of step is at least one of a rotation of the blade, a displacement of mixing and kneading container base, a first volume of grounded edible material and a second volume of liquid to produce the dough.

3. The method of claim 1, further comprising:

compressing the dough for one serving of flat edible to a spacer level by a first movement of the upper platen;

heating the upper platen and the lower platen; and repeating the movement of the upper platen as a second movement to touch the surface of the flat edible to cook the single flat edible.

4. The method of claim 3, wherein the temperature of the upper platen is higher than the lower platen.

5. The method of claim 3, further comprising:

transferring the cooked single flat edible using a transfer sweeper of a horizontal transfer unit from the lower platen to outside of the apparatus.

6. The method of claim 5, further comprising:

detaching the mixing and kneading container and blade to clean; and refilling the first dispenser and the second dispenser after the grounded edible and liquid has been utilized.

7. The method of claim 3, further comprising:

notifying a user of at least one of a level of the grounded edible material, a level of the liquid material, a temperature variation, a current fluctuation, a cycle change for the mixing and the kneading function for making the dough for one serving of the flat edible, a clean cycle, an update cycle and a completion time.

8. A method of making a single flat edible, comprising:

calculating a quantity of a grounded edible material to dispensed from a first dispenser and a quantity of a liquid material to be dispensed from a second dispenser for making a dough, for making one serving of a single flat edible material;

dispensing and mixing a calculated quantity of grounded edible material and a calculated quantity of liquid material to make a dough for at least one serving of the single flat edible material;

controlling an inflow of the grounded edible material and the liquid material based on a consistency of a dough for one serving of flat edible material, wherein the consistency of the dough is based on pre-determined consistency data;

providing a pressing mechanism and a lower platen;

controlling the pressing mechanism so as to flatten the dough to form a flat edible material, wherein the pressing mechanism comprises an upper platen and the dough is flattened by displacing the upper platen relative to the lower platen; and heating the lower platen for cooking the single flat edible material.

9. The method of claim 8, wherein the upper platen is heated to a temperature higher than the lower platen.

10. The method of claim 8, further comprising:

positioning a spacer between the upper platen and the lower platen to flatten the dough for one serving of flat edible to a desired thickness.

11. The method of claim 8, further comprising:

creating a sequence of steps through a processor to make the dough for one serving of flat edible;

timing the sequence of steps to perform a specified task; and optimizing a time of a step corresponding to a resistance reading by a change in current based on the dough consistency.

12. The method of claim 10, wherein the steps include at least one of: a rotation of a blade, a displacement of a mixing and kneading container base.

13. The method of claim 8, further comprising:

compressing the dough for one serving of flat edible to a spacer level by a first movement of the upper platen;

heating the upper platen and the lower platen; and repeating the movement of the upper platen as a second movement to contact the surface of a single flat edible to cook the single flat edible to inflate the single flat edible.

14. The method of claim 13, further comprising:

transferring the cooked flat edible using a transfer sweeper of a horizontal transfer unit from the lower platen to outside of the apparatus.

15. The method of claim 14, further comprising:

generating an alert for notifying a user based on at least one of an insufficient quantity of the grounded edible material, an insufficient quantity of the liquid material, a temperature variation, a current fluctuation, a cycle change for a mixing and a kneading function for making the dough for one serving of flat edible, a clean cycle, an update cycle and a completion time.

* * * * *